US012503934B2

(12) United States Patent
Bull et al.

(10) Patent No.: US 12,503,934 B2
(45) Date of Patent: Dec. 23, 2025

(54) CONTINUOUS PUMPING OPERATIONS USING CENTRAL PUMP AREA

(71) Applicant: Halliburton Energy Services, Inc., Houston, TX (US)

(72) Inventors: Brad Robert Bull, Duncan, OK (US); Timothy Holiman Hunter, Duncan, OK (US); Kurt Harpold, Duncan, OK (US); Gero Testa, Duncan, OK (US); Andrew Silas Clyburn, Duncan, OK (US); Brandon Ellis, Duncan, OK (US); Russell Ray Lockman, Denver, CO (US); Frank Kresse, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 110 days.

(21) Appl. No.: 17/688,177

(22) Filed: Mar. 7, 2022

(65) Prior Publication Data

US 2023/0279759 A1 Sep. 7, 2023

(51) Int. Cl.
*F16L 41/03* (2006.01)
*E21B 43/26* (2006.01)

(52) U.S. Cl.
CPC .......... *E21B 43/2607* (2020.05); *F16L 41/03* (2013.01)

(58) Field of Classification Search
CPC ............................ E21B 43/2607; F16L 41/03
USPC ....................................................... 166/308.1
See application file for complete search history.

(56) References Cited

U.S. PATENT DOCUMENTS

| | | | | |
|---|---|---|---|---|
| 5,807,021 | A * | 9/1998 | Aaron | B60B 39/12 238/14 |
| 9,127,545 | B2 | 9/2015 | Kajaria et al. | |
| 9,878,579 | B2 * | 1/2018 | Rosier | B60B 39/12 |
| 9,957,672 | B2 * | 5/2018 | Rosier | E01C 9/086 |
| 10,954,770 | B1 * | 3/2021 | Yeung | E21B 47/095 |
| 10,995,589 | B2 | 5/2021 | Funkhouser et al. | |
| 11,041,579 | B2 | 6/2021 | Lopez et al. | |
| 2007/0201305 | A1 | 8/2007 | Heilman et al. | |
| 2012/0181046 | A1 * | 7/2012 | Kajaria | E21B 43/16 166/380 |
| 2014/0290768 | A1 | 10/2014 | Randle et al. | |

(Continued)

FOREIGN PATENT DOCUMENTS

WO 2017015411 A1 1/2017

*Primary Examiner* — Nicole Coy
*Assistant Examiner* — Douglas S Wood
(74) *Attorney, Agent, or Firm* — John Wustenberg; Parker Justiss, P.C.

(57) ABSTRACT

The disclosure presents systems and methods for hot swapping pumps at a wellsite while minimizing the impact to the pumping operations. As one pump is swapped out, such as for maintenance, the remaining pumps in the set of pumps at the wellsite can continue pumping operations. In some aspects, the pumps can be arranged around a central open area where the manifold pipes are located on the outside perimeter. This arrangement allows for a pump moving apparatus to remove and locate pumps at various positions around the perimeter while minimizing movement and minimizing the time the pump moving apparatus spends off of matting. The pump moving apparatus can be shielded with a protective barrier to protect the equipment or user from discharges from other pumps that are under high pressure.

22 Claims, 7 Drawing Sheets

(56) References Cited

U.S. PATENT DOCUMENTS

| | | | | |
|---|---|---|---|---|
| 2015/0252661 | A1 * | 9/2015 | Glass | E21B 43/2607 166/308.1 |
| 2020/0386359 | A1 | 12/2020 | Johnson et al. | |
| 2022/0003056 | A1 * | 1/2022 | Chretien | E21B 41/00 |
| 2022/0018235 | A1 * | 1/2022 | Post | B25J 11/00 |
| 2022/0098964 | A1 * | 3/2022 | Johnson | E21B 43/2607 |
| 2022/0356794 | A1 * | 11/2022 | Johnson | E21B 43/2607 |

* cited by examiner

CONTINUOUS PUMPING OPERATIONS USING CENTRAL PUMP AREA

TECHNICAL FIELD

This application is directed, in general, to using high pressure pumps for well site operations and, more specifically, to minimizing maintenance windows of the operations.

BACKGROUND

In the oil and gas industry, unconventional reservoirs often have a low-permeability rock matrix that impedes fluid flow, making it difficult to extract hydrocarbons (or other fluids of interest) at commercially-feasible rates and volumes. Often, the effective permeability of the formation can be increased by using high pressure pumps to inject a fluid into an injection well proximate a production well or using hydraulic fracturing (HF) techniques. HF can use a proppant-ladened HF slurry (fracturing slurry), pumped at a desired inlet downhole flow rate with the goal of keeping the fractures open after the fluid pressure is removed. HF slurry flow can be controlled by one or more pumps located at the well site surface. Keeping the surface pumps operating, whether HF pumps or injection pumps, while minimizing system downtime, would be beneficial and improve the efficiency and improve the operating costs of the well site.

SUMMARY

In one aspect, a pumping system is disclosed. In one embodiment, the pumping system includes (1) a pump manifold, capable of transporting low pressure fluids and high pressure fluids for well site operations, where the pump manifold is located at a well site, (2) a set of pumps coupled to the pump manifold using one or more isolation devices for each pump in the set of pumps, wherein the one or more isolation devices are capable of isolating one or more pumps in the set of pumps, and (3) a pump swap tool, capable of removing a first pump from the set of pumps and placing a second pump into the set of pumps, wherein the pumping system continues pumping operations during the removing and placing, and the set of pumps are arranged on a perimeter of a central open area and the removing and placing are performed proximate the perimeter of the central open area.

In a second aspect a method to hot swap pumps in a pumping system is disclosed. In one embodiment, the method includes (1) isolating a first pump in a set of pumps using an isolation device, wherein the set of pumps has at least two pumps, the set of pumps are utilized to pump fluid under a high pressure into a wellbore, and the set of pumps are coupled to the pumping system, (2) bleeding the high pressure from the first pump, and evacuating fluid from the first pump, (3) disconnecting the first pump, (4) swapping the first pump with a second pump, wherein the second pump is added to the set of pumps and the first pump is removed from the set of pumps, (5) connecting the second pump to the pumping system, and (6) enabling the second pump for pumping operations, wherein the set of pumps are arranged on a perimeter of a central open area and the swapping is performed within the perimeter of the central open area.

BRIEF DESCRIPTION

Reference is now made to the following descriptions taken in conjunction with the accompanying drawings, in which.

DETAILED DESCRIPTION

Figure 1:
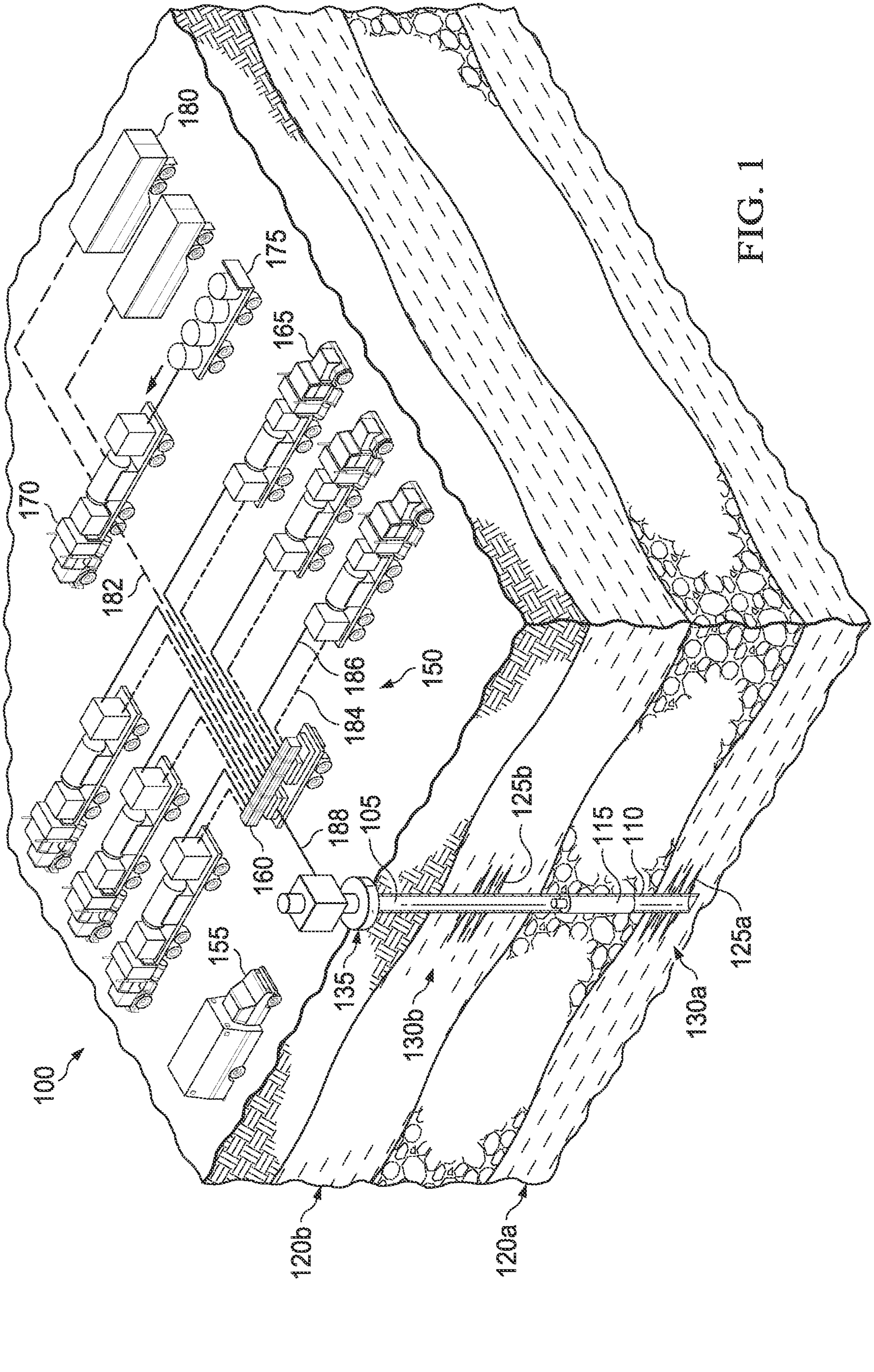
FIG. 1 is an illustration of a diagram of an example hydraulic fracturing well system.

In various well systems, such as hydraulic fracturing (HF) well systems and injection well systems, pumps can be used to pump fluid down the wellbore and to pump fluid from within the wellbore to a surface location. In HF operations, for example, fluid can be used to cause fractures in a subterranean formation to enable the collection of hydrocarbons from the wellbore. The fluids used can be one or more of various fluids, slurries, water, or brine, and can have zero or more additives, such as chemicals, proppants, diverter material, sand, and other additives.

At a well site, one or more positive displacement pumps can be utilized to pump the fluid downhole at a high pressure, for example, 14,000 pounds per square inch (PSI) or at other pressures. The high pressure side of the pumps can be identified as the downstream side of the pumps, from the pumps to the wellbore. The low pressure side of the pumps can be identified as the upstream side of the pumps, from a fluid or slurry source to the pumps. In some aspects, the pumps can be connected to discharge manifold equipment (DME), which is high-pressure piping equipment used for temporary installation at a job site. DME can be characterized as being readily portable with end connections, such as hammer union connections, or special hub or clamp connections that can be relatively fast to assemble. Flanged adapters and spools, along with certain crossovers or changeovers with one flange or tool joint connection on one end and hammer union or special hub or clamp connections, can also be considered DME.

In some aspects, a fluid pumped at a high pressure can be the fluid in the high pressure portion of the pump system, i.e., the pressure-containing elements downstream of the positive displacement pumps, such as between the pumps and the wellbore. The pressure-containing elements upstream of the pumps can be considered low pressure elements containing low pressure fluid. High pressure fluid is typically the treatment pressure of the wellbore. The high pressure can range from near atmospheric pressure levels up to 20,000 PSI. In some aspects, an average range of high pressure can be 7,000 PSI to 9,000 PSI, with some wellbore operations using a lower or higher pressure limit, for example, 5,000 PSI to 15,000 PSI.

Fluid at a low pressure, such as the up-stream side of the pumps, can utilize a pressure of 200 PSI or lower, such as 0 PSI to 200 PSI. In some aspects, the low pressure side of the pumps can handle fluid up to 2,000 PSI.

Conventionally, when a pump is ready for maintenance, the pumping system is shut down and the pressure is bled off. Once the pressure has been relieved, then it is safe for workers to approach the pump and perform a swap operation where the pump needing maintenance is removed and a replacement pump is located in the first pump's location. Typically, pumping operations have a duration of about 2 hours followed by 20 to 30 minutes of downtime to perform the maintenance operations. This can be referred to as a treatment stage of a well site operation plan.

This downtime increases the cost of operating the well site and can reduce the production per day of hydrocarbons from the wellbore or a production wellbore near the injection wellbore. It would be beneficial to increase the time pumping operations can be continued while minimizing the downtime maintenance time interval.

This disclosure presents processes to enable hot swapping of pumps at a well site location where the pumping operations can continue while a pump is replaced. This can effectively decouple pumping unit maintenance or pump unit swaps from well site operations, such as HF operations (e.g., using HF pumping systems) or injection well operations (e.g., using injection pumping systems). Hot swapping can eliminate other non-pump activities (ONPA) and reduce non-productive time (NPT). Worker resources can also be made more efficient, such as through the use of automating the hot swap activities.

The processes can isolate a first pump using an isolation device. The first pump can be disconnected from the pumping system and moved away from the pumping system. A second pump, e.g., a replacement pump, can be placed in the first pump's vacant spot, connected to the pumping system, primed, pressure tested and enabled for operational use. Maintenance can then be performed on the first pump. In some aspects, the first pump can be a replacement pump for a subsequent hot swap of pumps. In some aspects, the replacement pump can be primed and pressure tested prior to positioning it in the vacant spot, providing a faster time to enable the replacement pump as operational.

In some aspects, the pumps can be arranged around a perimeter of a central open area. A pump swap tool can be utilized in the interior area of the central open area to swap pumps as needed.

In some aspects, the pump swap tool can include a pump moving apparatus such as a forklift, a powered industrial truck (PIT), a tractor, a gantry crane, or other type of dedicated moving device. In some aspects, the pump moving apparatus can have one or more user observation windows. In some aspects, the one or more user observation windows can be protected by a protection barrier. In some aspects, a central open area can reduce the footprint of the well site equipment. In some aspects, a central open area can have matting to reduce the time the pump swap tool spends on open ground, such as dirt, mud, sand, or other ground covering material. This can reduce the amount of particulates kicked into the air and reduce the amount of particulates that could cause maintenance issues for the pumps, pump swap tool, or other well site equipment.

In some aspects, the pump swap tool can be partially or fully automated. In some aspects, the pump swap tool can include one or more cameras or other sensors, such as to help guide it during operations. The cameras or other sensors can be utilized by an automated system or by a worker operating the pump swap tool. In some aspects, the pump swap tool can be utilized for proppant, sand, or other material movement at the well site. In some aspects, there can be more than one pump swap tool or more than one pump moving apparatuses.

In some aspects, the pump swap tool can include a pump connection apparatus that can enable operations to connect or disconnect a pump from the pumping system. The pumping system can include a pump manifold, such as a manifold trailer. In some aspects, the disconnect operation can include operations utilizing one or more isolation devices to fluidly isolate the first pump, to bleed off high pressure within the first pump, and to physically disconnect the first pump from the pumping system, such as from the pump manifold.

In some aspects, the connect operation can include operations to physically connect the second pump, e.g., the replacement pump, to the pumping system. In some aspects, the connect operation can include operations to prime or pressure test the second pump. In some aspects, the second pump can be primed or pressured tested prior to it being placed. In some aspects, the connect or disconnect operations can be performed automatically, using an automated pump connection apparatus, such as being directed by a well site controller or remotely directed by a worker.

In some aspects, the pump swap tool can place a protection barrier to protect an area proximate the first pump, sufficient to protect one or more workers from discharges from other pumps in the set of pumps. For example, a protection barrier can be placed around the first pump to allow one or more workers to perform disconnect operations, and to perform connection operations for the second pump. The protection barrier can protect the workers from a discharge from the other pumps coupled to the manifold, such as a burst of a high pressure fluid line. In some aspects, the protection barrier can be placed by a worker directed operation or by an automatic operation, such as directed by a well site controller or other computing system.

The pump swap tool, and its potential components, the pump connection apparatus and the pump moving apparatus, can be directed by a worker, a well site controller, a computing system, or a combination thereof, such as partially directed by a worker and partially automated using the well site controller.

In some aspects, the pumps in the set of pumps located proximate the perimeter of the central open area can be on one or more pump unit skids in various combinations. In some aspects, more than one pump can be located on one pump unit skid. In some aspects, the pump unit skids can be modular allowing the pump to removed or placed while the pump unit skid remains in place.

In some aspects, the pump manifold can be located proximate the inside perimeter formed by the set of pumps. In some aspects, the pump manifold can be located proximate the outside perimeter formed by the set pumps.

Turning now to the figures, FIG. 1 presents a schematic, perspective view, with a portion in cross-section, of an illustration of a diagram of an example HF well system 100, together with a HF system 150 for controlling the proppant flow by a set of HF fluid pumps.

HF well system 100, in one or more aspects, includes a wellbore 105 that includes a casing 110 that is cemented or otherwise secured to a wall of wellbore 105. While wellbore 105 is illustrated as including casing 110, other aspects can exist wherein wellbore 105 is a partially cased or includes no casing, e.g., an open hole wellbore. A fracturing plug tool 115 is positioned in wellbore 105 to isolate subterranean formation interval **120*a* and subterranean formation interval 120*b***.

HF system 150 can be used to create fractures **125*a* or fractures 125*b* in the respective subterranean formation interval 120*a* or subterranean formation interval 120*b*. Fractures 125*a* or fractures 125*b* can increase formation porosity for increasing the fluid conductivity of respective flow path 130*a* and flow path 130*b* between the respective subterranean formation interval 120*a*, subterranean formation interval 120*b*, and wellbore 105. Perforations can be formed in casing 110 to allow fracturing fluids or slurries to flow into subterranean formation interval 120***a* or subterranean formation interval 120*b*. HF well system 100 can include a wellhead tree 135 to cap wellbore 105.

HF system 150 can include an operation control unit 155 (e.g., a well site controller), a manifold unit 160, and a set of HF pumps 165 (e.g., a truck-mounted HF pump as shown, or a trailer, a skid, or a non-skid mounted HF pump). Set of HF pumps 165 include two or more HF pumps. HF system 150 can include a blender unit 170 (e.g., one or more blending trucks, trailers, tanks, or other types of storage units), as well as a one or more proppant storage tanks 175 and one or more HF fluid tanks 180. In at least one aspect, blender unit 170 can combine proppant from one or more proppant storage tanks 175 and fluid from HF fluid tanks 180 to form a fracturing slurry.

As shown, the fracturing slurry can be transported to manifold unit 160 via a low pressure fracturing slurry line 182. Manifold unit 160, as shown, can then supply the low pressure fracturing slurry, e.g., low pressure fluids, to set of HF pumps 165 via low pressure lines 184. Set of HF pumps 165 can greatly increase the pressure of the fracturing slurry, and then transport the high pressure fracturing slurry, e.g., high pressure fluids, back to manifold unit 160 via the high pressure lines 186. Thereafter, the manifold unit 160 can supply the high pressure fracturing slurry to wellhead tree 135 via a high pressure line 188. The high pressure fracturing slurry can be transported to a location downhole wellbore 105 to, for example, forming fractures 125*a* or fractures 125*b* in respective subterranean formation interval 120*a* or subterranean formation interval 120*b*.

One skilled in the pertinent art would understand how the fracturing slurry fluid, pumped via set of HF pumps 165 and manifold unit 160 into wellbore 105 at a high a flow rate and pressure, can be used as part of HF well system 100 to create or increase fractures 125*a* or fractures 125*b* in respective subterranean formation interval 120*a* or subterranean formation interval 120*b*. For example, the fracturing slurry fluid, including a hydrated gel, resins (e.g., epoxy or other polymer resins), chemicals, additives, diverter material, or combinations thereof, can be pumped into fractures 125*a* or fractures 125*b* to prop respective fractures 125*a* or fractures 125*b* open or to divert the fracturing slurries to other fractures, to thereby effectively increase the formation's porosity. Optimizing the hydrocarbon extraction is beneficial for operations at HF well system 100 and can be done by altering the composition of the fracturing slurry fluids, for example, modifying the proportion of proppants in the fracturing slurries at different stages of HF treatment of HF well system 100.

In some aspects, operation control unit 155, which can be a well site controller, a computing system, or other type of controller, can be configured to coordinate the HF operation, including controlling the flow though set of HF pumps 165, to deliver the fracturing slurry fluid downhole of wellbore 105. Operation control unit 155 can be in communication with the other system components to monitor flow rates and pressures of set of HF pumps 165, manifold unit 160, and wellhead tree 135. Operation control unit 155 can be configured to control the delivery rates of proppants or other optional components from corresponding one or more proppant storage tanks 175 and HF fluid tanks 180 to blender unit 170.

In some aspects, set of HF pumps 165 can communicate a status to operation control unit 155, such as a status of maintenance that may be needed. In some aspects, operation control unit 155 can monitor the operational time, fluid output, or other statues of each pump in set of HF pumps 165 to identify a HF pump in set of HF pumps 165 that need to be swapped out. Employing one or more aspects as disclosed, a HF pump can be hot swapped out of set of HF pumps 165 and a replacement pump can be located within set of HF pumps 165 while keeping set of HF pumps 165 operational.

The term "proppant" as used herein refers to particulate solids which, during fracturing treatment of a reservoir formation, are blended with a fracturing fluid and transported downhole in a wellbore for placement within a fracture flow path to retain conductive channels in subterranean fractures through which fluids may travel. Suitable materials for proppants, can include but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite proppants may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

The term "fracturing fluid" as used herein refers to a base fluid and one or more optional additives. Such additives include, but are not limited to salts, weighting agents, inert solids, fluid loss control agents, emulsifiers, dispersion aids, corrosion inhibitors, emulsion thinners, emulsion thickeners, viscosifying agents, gelling agents, surfactants, particulates (such as proppant or gravel), lost circulation materials, foaming agents, gases, pH control additives, breakers, biocides, crosslinkers, stabilizers, chelating agents, scale inhibitors, gas hydrate inhibitors, mutual solvents, oxidizers, reducers, friction reducers, clay stabilizing agents, diverter materials, other types of additives, or combinations thereof. Suitable base fluids of the fracturing fluids include, but are not limited to, oil-based fluids, aqueous-based fluids, aqueous-miscible fluids, water-in-oil emulsions, or oil-in-water emulsions. The fracturing fluid can include dispersants to control agglomeration of the particulate solids, viscosity-enhancing additives to inhibit settling and modify flow behavior, and iron control agents to prevent the precipitation of metal oxides. Other chemicals and substances can be incorporated into the fracturing fluid in order to enhance fracture treatment of the reservoir formation.

The term HF slurry fluid or "fracturing slurry" as used herein refers to a suspension of proppants with the fracturing fluid.

Figure 2:
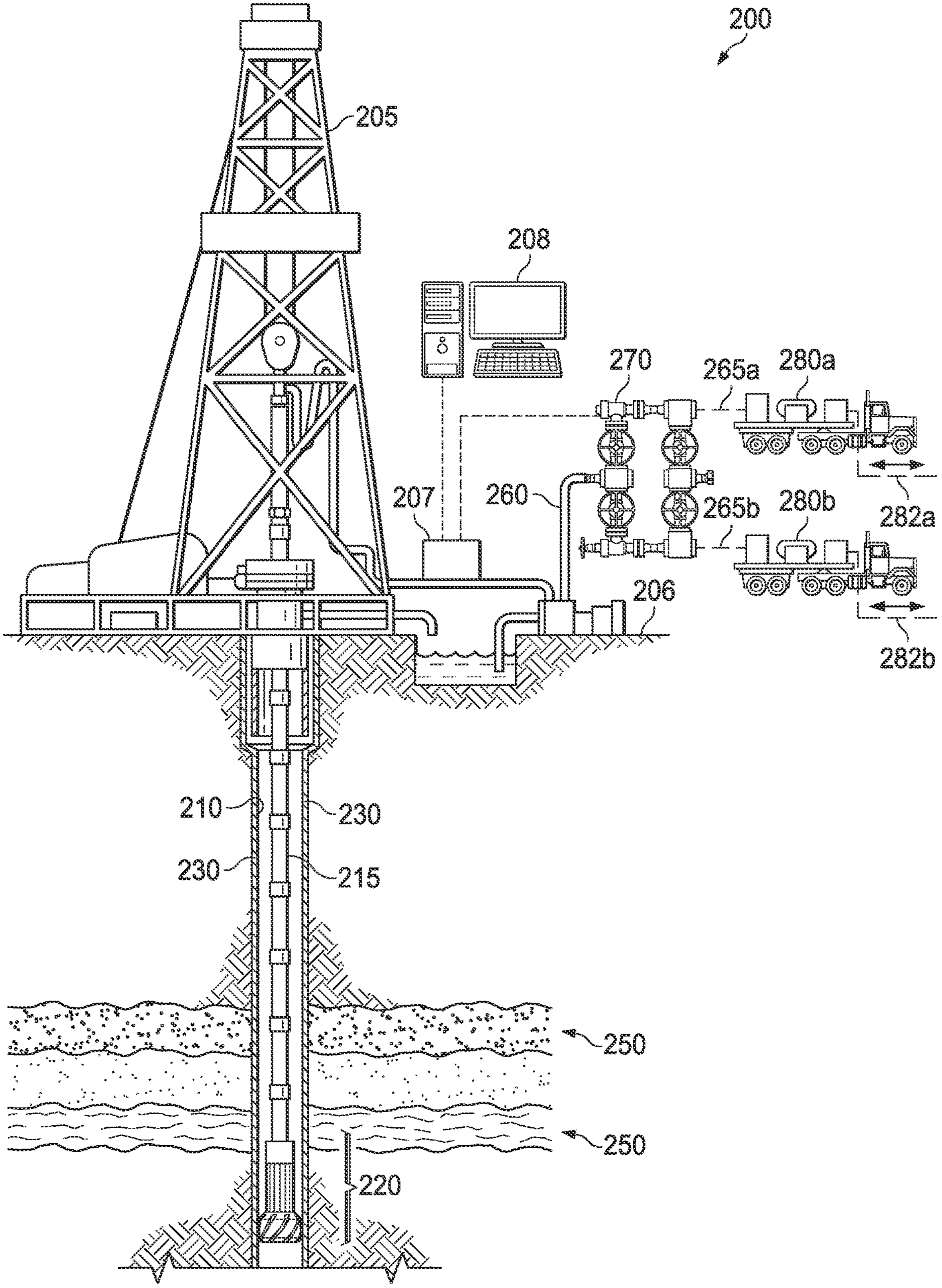
FIG. 2 is an illustration of a diagram of an example injection well system.

FIG. 2 is an illustration of a diagram of an example injection well system 200. Injection well system 200 includes a derrick 205, a well site controller 207, and a computing system 208. Well site controller 207 can be positioned central to the well site operation or local to the one or more equipment devices to form a data network among other equipment devices or data transmitters. Well site controller 207 includes a processor and a memory, and is configured to direct operation of injection well system 200. Derrick 205 is located at a surface 206.

Extending below derrick 205 is a wellbore 210 with downhole tools 220 at the end of a fluid pipe 215. Downhole tools 220 can include various downhole tools, such as sensors, pumps, and other end of pipe tools, for example, tools to direct the injection of fluid into a subterranean formation 250. Other components of downhole tools 220 can be present, such as a local power supply (e.g., generators, batteries, or capacitors), telemetry systems, transceivers, and control systems. Wellbore 210 is surrounded by subterranean formation 250.

Well site controller 207 or computing system 208 which can be communicatively coupled to well site controller 207, can be utilized to communicate with downhole tools 220, such as sending and receiving telemetry, data, instructions, subterranean formation measurements, and other information. Well site controller 207 can be communicatively coupled to a fluid pumping system, for example a pump manifold 260, a pump 280*a*, and a pump 280*b* (collectively, a set of pumps 280).

Computing system 208 can be proximate well site controller 207 or be a distance away, such as in a cloud environment, a data center, a lab, or a corporate office. Computing system 208 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 208 or well site controller 207. Well site controller 207 or computing system 208 can communicate with downhole tools 220 using conventional means, now known or later developed, to direct operations of downhole tools 220.

Casing 230 can act as barrier between subterranean formation 250 and the fluids and material internal to wellbore 210, as well as fluid pipe 215. The injection fluids from the pumping system enter wellbore 210 and flow downhole. The injection fluids flow through a pipe 265*a* and 265*b* from pumps 280 through an isolation device 270 to pump manifold 260 and continues downhole. A pipe 282*a* and a pipe 282*b* can provide injection fluid from a storage area, including any additives, chemicals, proppant, or other material added to the injection fluid. Isolation device 270 can be utilized to isolate one of pump 280*a* or pump 280*b* to allow that isolated pump to be replaced by another pump while maintaining injection fluid operations at injection well system 200.

FIGS. 1 and 2 depict onshore operations. Those skilled in the art will understand that the disclosure is equally well suited for use in offshore operations, for example, where HF pumps can be located on an offshore rig or boat. FIGS. 1-2 depict specific wellbore configurations, those skilled in the art will understand that the disclosure is equally well suited for use in wellbores having other orientations including vertical wellbores, horizontal wellbores, slanted wellbores, multilateral wellbores, and other wellbore types.

Figure 3:
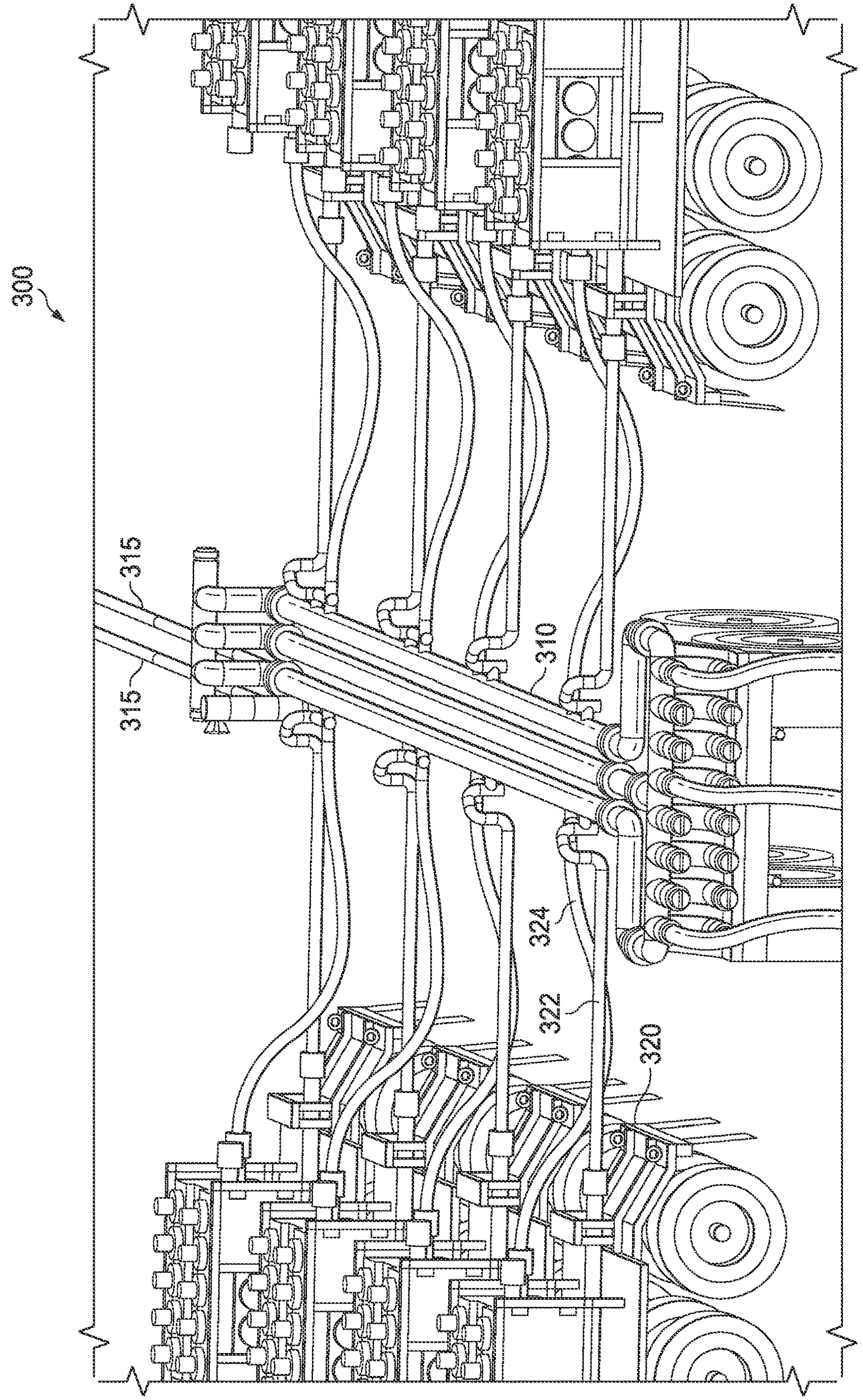
FIG. 3 is an illustration of an image of an example set of well site pumps.

FIG. 3 is an illustration of an image of an example set of well site pumps 300. Set of well site pumps 300 show a pumping system such as used for HF. Set of well site pumps 300 demonstrate eight pumps, where other aspects can have two or more pumps, for example, 18 to 24 pumps. A pump manifold 310, such as a manifold trailer provides a conduit for the high pressure fluid, e.g., fracturing slurry, to be pumped downhole and the low pressure slurries flowing to the pumps. Pipes 315 fluidly couple pump manifold 310 and a downhole location of the wellbore. A pump, such as pump 320, is coupled to pump manifold 310 using a high pressure pipe 322 and a low pressure pipe 324.

Typically, a safety radius of one and a half times the length of the longest arm, e.g., high pressure pipe, is used for worker safety. Should pump 320 need to be replaced, the pumping system would need to be shut down with excess pressure bled off prior to allowing workman into the area to perform the disconnection of pump 320 and connection of a replacement pump in that location. In some aspects, to enable hot swapping, where the pumping system remains operational, a protection barrier can be placed around pump 320 to protect workers from the other pumps in set of well site pumps 300 while the swapping takes place. The protection barrier can be transient for the time the maintenance operation takes place, or the protection barrier can be permanently placed around each of the pumps. In some aspects, the protection barrier placement can be automated. In some aspects, the disconnection or connection operations can be automated. In some aspects, the physical removal and physical placement of pumps can be automated.

Figure 4:
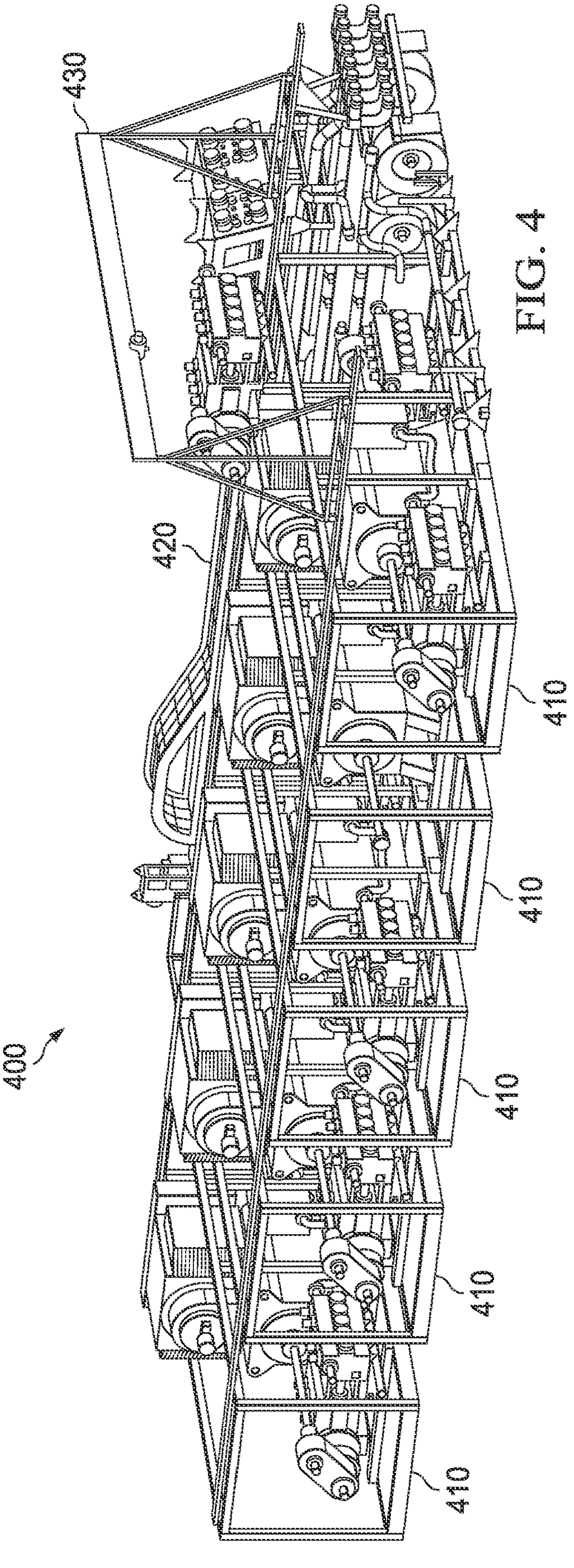
FIG. 4 is an illustration of a diagram of an example set of well site pumps with a gantry crane.

FIG. 4 is an illustration of a diagram of an example set of well site pumps 400 with a gantry crane. Set of well site pumps 400 demonstrates one aspect of a system for decoupling pump maintenance from pumping operations. A gantry crane can be erected over a skid based pumping system. The system is designed to allow the crane to remove or install pumps during pumping operations.

Set of well site pumps 400 has each pump 410 located on a skid, unlike the pumps of set of well site pumps 300 that were located on separate trailers or a trucks. Each pump 410 is coupled to a pump manifold 420. Above each pump 410 is a gantry crane 430 that can be operated by a worker proximate to gantry crane 430, by a worker a distance from gantry crane 430, or by an automation process. Gantry crane 430 can be used to hot swap a pump, such as to place a protection barrier, to automate the disconnection and reconnection operations, to physically remove a pump, to physically place a replacement pump, or a combination thereof.

Figure 5:
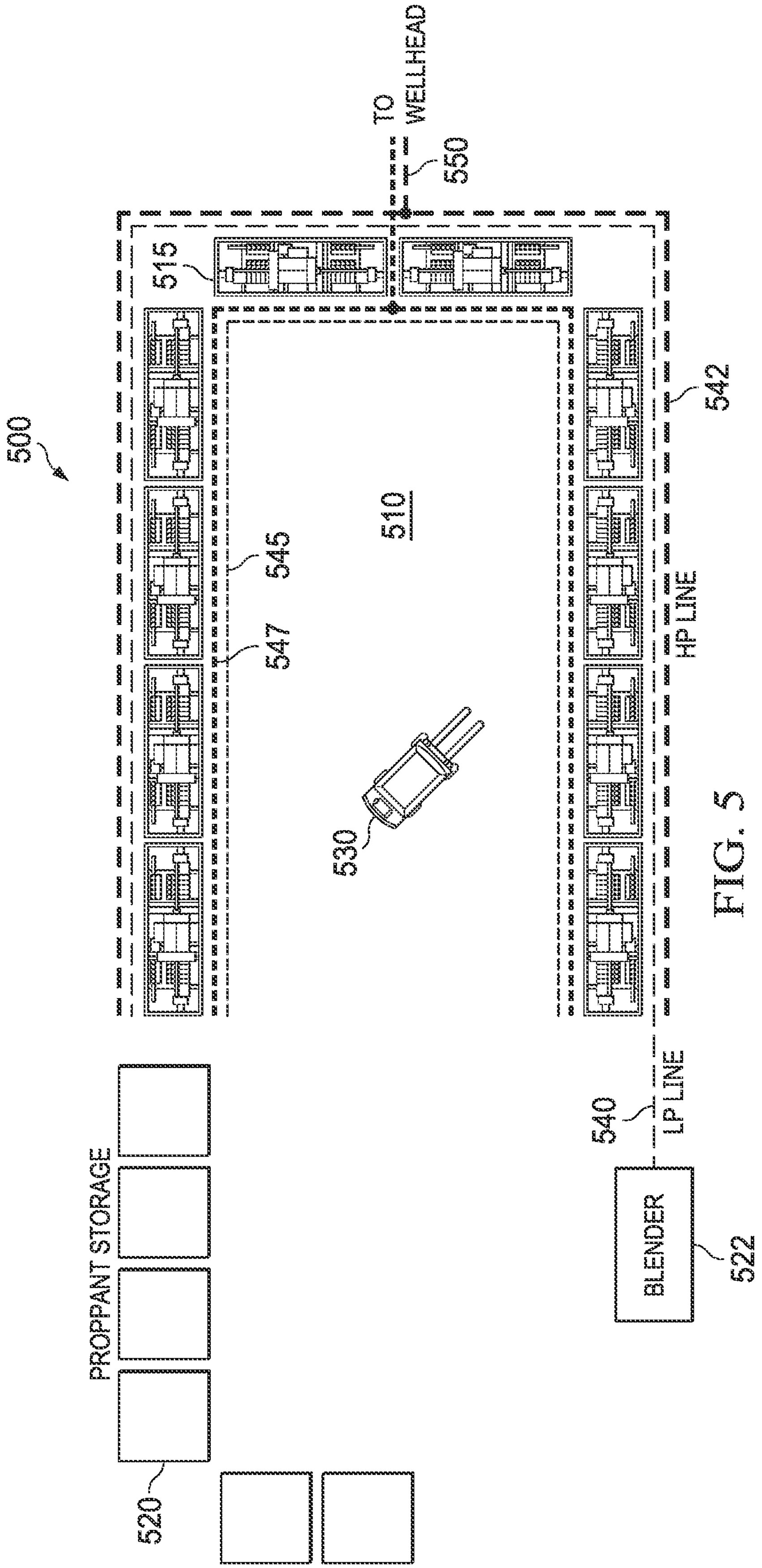
FIG. 5 is an illustration of a diagram of an example central open area with an arrayed set of well site pumps.

FIG. 5 is an illustration of a diagram of an example central open area system 500 with an arrayed set of well site pumps. Central open area system 500 creates a central open area allowing a worker access to all pumping units on the job. High pressure lines can be routed out of the working area creating a safe zone of operation. This configuration can be combined with proppant handling areas to create a continuous area of PIT operation to share resources with both systems. Barriers can be utilized as needed to minimize or isolate areas from the red zone.

Central open area system 500 has a set of well site pumps 515 that are arrayed proximate the outside perimeter of a central open area 510. This design can improve efficiency by allowing one or more pump moving apparatuses 530 to operate in a confined area. In some aspects, central open area 510 can be matted to minimize the time one or more pump moving apparatuses 530 spend on unprotected ground.

In some aspects, central open area 510 can be proximate proppant storage area 520 and blender area 522. This placement can improve efficiency by minimizing the travel distance of one or more pump moving apparatuses 530 while continuing well site operations.

In this aspect, a low pressure pipe 540 fluidly couples each pump in set of well site pumps 515 to blender area 522, and a high pressure pipe 542 fluidly couples each pump in set of well site pumps 515 to s a wellhead 550 and downhole locations. In some aspects, a low pressure pipe 545 (shown as a dashed line) and a high pressure pipe 547 (shown as a dashed line) can be used in place of low pressure pipe 540 and high pressure pipe 542, and be positioned approximately on an inner perimeter of set of well site pumps 515.

In some aspects, low pressure pipe 540 and high pressure pipe 542 can be a part of a pump manifold. In some aspects, the pump manifold can be located at wellhead 550. In some aspects, low pressure pipe 545 and high pressure pipe 547 can be a part of a pump manifold.

Figure 6:
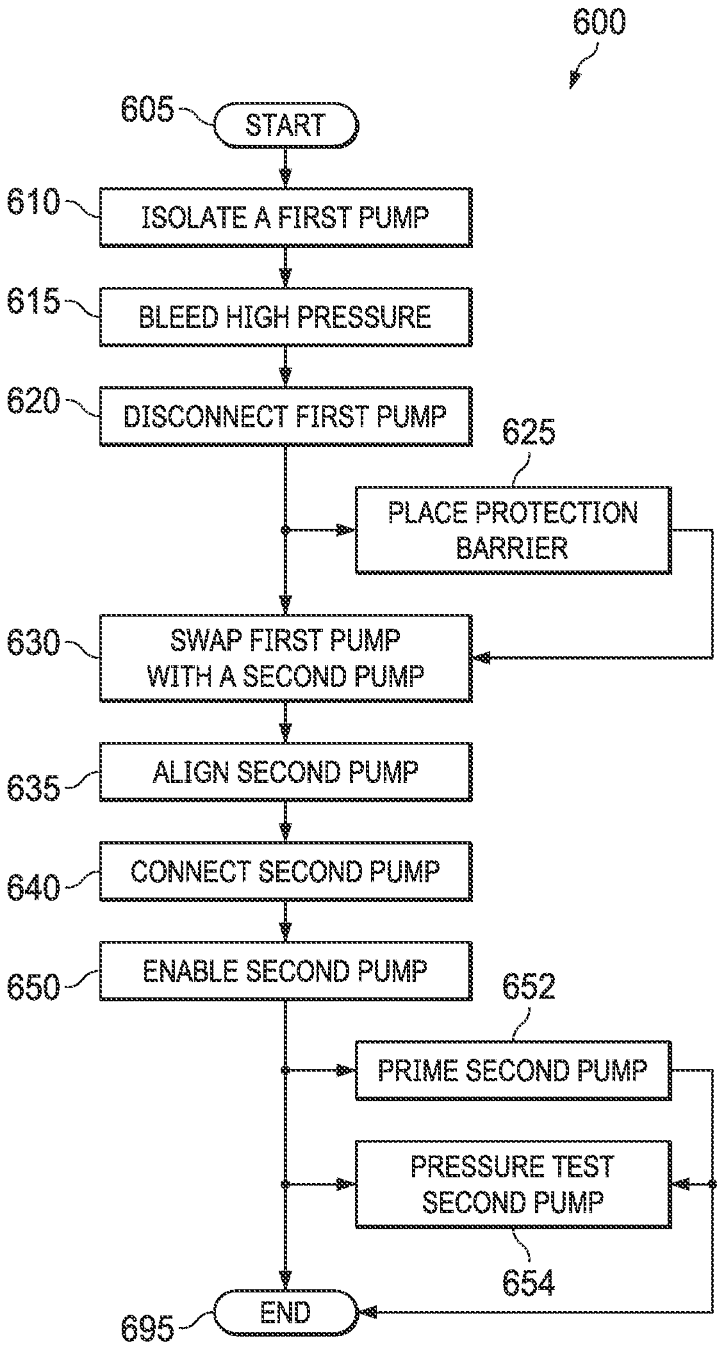
FIG. 6 is an illustration of a flow diagram of an example method to hot swap well site pumps.

FIG. 6 is an illustration of a flow diagram of an example method 600 to hot swap well site pumps. Method 600 can be performed, for example, by workers performing pump swap operations. Method 600 can be performed at various types of well sites, for example, an injection well site or a HF well site.

Method 600 starts at a step 605 and proceeds to a step 610. In step 610, an identified pump (e.g., a first pump), in a set of pumps can be isolated using an isolation device. In some aspects, more than one isolation device can be utilized. An isolation device can be various types of isolation valves, for example, one or more check valves, one or more plug valves, one or more gate valves, one or more butterfly valves, or one or more valves of combinations thereof. The isolation device can utilize one or more active isolation valves or one or more automated isolation valves. The isolation device can be suitable to fluidly isolate the first pump from the pump manifold. The isolation device can be manipulated by a worker or through automation. In some aspects, a protection barrier can be placed proximate the first pump thereby providing a safe area for workers to perform operations on the first pump. In some aspects, the protection barrier can be placed prior to pumping operations beginning, e.g., a permanent protection barrier around each pump.

In a step 615, the first pump can be bled of high pressure. This operation can be performed by a worker or through automated techniques. If a protection barrier is warranted and not positioned in step 610, the protection barrier can be optionally positioned proximate the first pump. In a step 620, if a protection barrier is warranted and not positioned in step 610 or step 615, the protection barrier can be positioned proximate the first pump in a sub step 625. The first pump can be disconnected from the pump manifold at the isolation device. The disconnection operation can be performed by a worker at the first pump, such as when the protection barrier is present, by a worker using tools such as a pump connection apparatus, a worker remotely using remote controlled tools such as a pump connection apparatus, or by an automated process using the pump connection apparatus.

In a step 630, the first pump can be removed from its location and a second pump, e.g., a replacement pump, can be placed in the location vacated by the first pump, e.g., swapping pumps. A pump swap tool can be used to perform this operation. In some aspects, the pump swap tool can include a pump moving apparatus, for example, a forklift, a PIT, a tractor, a gantry crane, or other type of pump moving machine. The pump moving apparatus can be operated by a worker where the worker is protected by a protection barrier. In some aspects, user observation windows of the pump moving apparatus can be protected by the protection barrier. In some aspects, cameras can be positioned to provide a worker a sufficient field of view to perform the swapping operation. In some aspects, the pump swap tool can be remotely operated by a worker. In some aspects, the pump swap tool can be automated and operations directed by a well site controller or other computing system.

In some aspects, prior to placing the second pump, the second pump can be primed or pressure tested. This can reduce the time it takes to enable the second pump for operational use, thereby reducing costs.

In a step 635, the second pump's connections can be aligned with the isolation device of the pump manifold. This can be an optional step. This operation can be performed by a worker proximate the second pump, by a worker remotely using a pump connection apparatus, or by an automated process using the pump connection apparatus, such as being directed by a well site controller or other computing system. In a step 640, the second pump can be connected to the isolation device. This can include one or more operations of suction, discharge, drive power, fuel, lubrication, cooling, communication, and other operational steps. This operation can be performed by a worker proximate the second pump, by a worker remotely using a pump connection apparatus, or by an automated process using the pump connection apparatus, such as being directed by a well site controller or other computing system. In aspects where step 635 is optional, then step 640 can include placing the second pump in a position for fluid coupling with the isolation device.

In a step 650, the second pump can be enabled for operational use. If the second pump has not been primed or pressure tested in a previous step, then method 600 proceeds to a step 652 or a step 654. In a step 652, the second pump can be primed. In a step 654, the second pump can be pressure tested. After the one or more of step 652 or step 654 have completed, or if these steps are not needed then at the completion of step 650, method 600 proceeds to step 695 and ends.

In some aspects, where at least one step of method 600 is automated or partially automated, method 600 can be performed on a computing system, such as a well site controller, data center, cloud environment, edge computing system, server, laptop, mobile device, or other computing system capable of receiving input parameters, such as an identification or location of the pump needing to be replaced, and an identification or location of a replacement pump, and capable of communicating with other computing systems or well site equipment, for example, pump moving apparatuses, pump connection apparatuses, isolation devices, and other equipment. In this aspect, method 600 can be encapsulated in software code or in hardware, for example, an application, code library, dynamic link library, module, function, RAM, ROM, and other software and hardware implementations. The software can be stored in a file, database, or other computing system storage mechanism. Method 600 can be partially implemented in software and partially in hardware.

Figure 7:
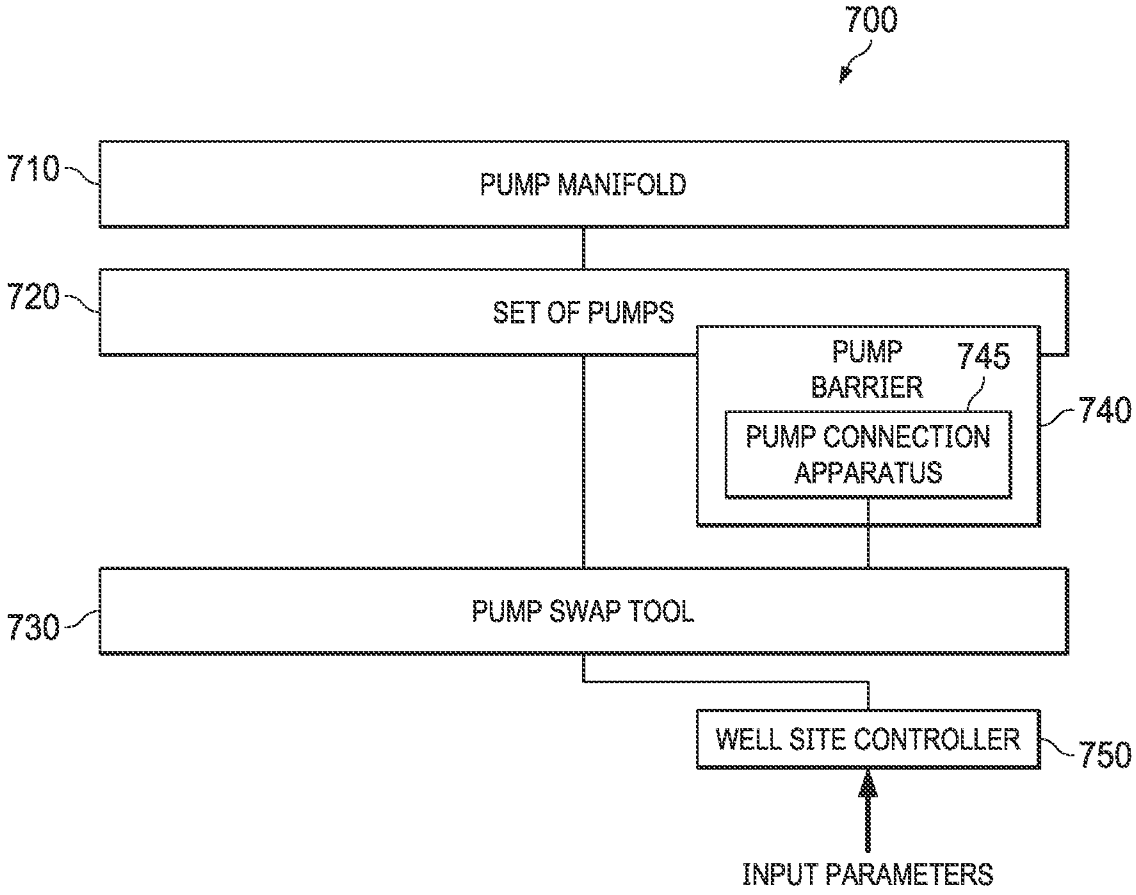
FIG. 7 is an illustration of a block diagram of an example pump swap system.

FIG. 7 is an illustration of a block diagram of an example pump swap system 700. Pump swap system 700 can be utilized to hot swap a pump from a set of pumps at a well site where the remaining pumps continue operations while the first pump is being replaced. Such operations can be, for example, a HF operations or injection well operations. Pump swap system 700 can use one or more machines, equipment, or apparatuses, for example, isolation devices, pump swap tools, pump moving apparatuses, or pump connection apparatuses. These machines, equipment, or apparatuses can be operated by a worker, remotely operated by a worker, or be automated and directed by a well site controller or other computing systems.

Pump swap system 700 has a pump manifold 710, such as a manifold trailer. Pump manifold 710 provides the fluid coupling to a set of pumps 720, fluid or slurry sources, such as a blender, or one or more storage areas or tanks. Pump manifold 710 also provides fluid coupling to a wellhead or downhole location of a wellbore. Pump manifold 710 can have one or more isolation devices that are capable of fluidly isolating each pump in set of pumps 720.

A pump swap tool 730 can be available to perform one or more of the operations to swap a first pump out of set of pumps 720 and place a second pump at the location of the first pump in set of pumps 720. Pump swap tool 730 can have one or more tools, machines, or equipment, for example, a pump moving apparatus or a pump connection apparatus. In some aspects, pump moving apparatus and pump connection apparatus can be the same apparatus. In some aspects, the pump swap tool is the pump moving tool. In some aspects, the pump swap tool is the pump connection tool. In some aspects, the pump swap tool is the pump connection tool and the pump moving tool.

In a worker operation or partial remotely operated operation, pump swap tool 730 can place a pump barrier 740 to isolate the first pump allowing workers to safely interact with the first pump while being protected from discharges from the other pumps in set of pumps 720. In a partially remotely operated operation or an automated operation, a pump connection apparatus 745 can be present to perform one or more operations to disconnect the first pump, such as performing the isolation operations, bleeding off excess pressure, and removing physical connections. Pump connection apparatus 745 can be present to perform one or more operations to connect the second pump, e.g., a replacement pump, such as aligning the second pump, physically connecting the second pump, priming the second pump, pressure testing the second pump, and other operations to enable the pump to operate.

A well site controller 750 can be optionally present to direct one or more of the hot swap operations. Well site controller 750 can receive input parameters to initiate the processes. For example, the input parameters can include an identification of a pump that should be replaced, a location of a pump that should be replaced, or operating efficiency or hours of operation of each pump in set of pumps 720 where well site controller 750 can determine when a pump would need to be replaced.

Well site controller 750 can provide information to a worker to perform one or more of the operations, or can partially or fully perform one or more of the operations using automation, such as directing pump swap tool 730, pump connection apparatus 745, a pump moving apparatus, or directing other well site equipment. For example, well site controller 750 can direct operations of a PIT to isolate, disconnect, and remove a first pump at a location around the perimeter of a central open area. Further directions can be provided to the PIT to place a second pump and perform connection operations. To improve the time to perform the hot swap of pumps, the second pump can be primed and pressure tested prior to being placed in set of pumps 720.

Well site controller 750 can be part of a well site computing system (such as well site controller 207), a separate computing system located proximate the well site area (such as computing system 208), or a computing system located a distance away, such as a data center, a cloud environment, or an edge computing system. Well site controller 750 can be a smartphone, laptop, server, or other type of computing system capable of communicating with pump swap tool 730, pump connection apparatus 745, pump moving apparatus, set of pumps 720, and other well site equipment. Well site controller 750 can utilize machine learning or deep neural network systems to perform its operations. For example, well site controller 750 can utilize machine learning to improve the directing of operations of a PIT, an automated forklift, an automated tractor, or an automated gantry crane at the well site. Well site controller 750 can utilize software, hardware, or a combination thereof to store and utilize application directions and operations.

The disclosure may be implemented in embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results. Moreover, all statements herein reciting principles and aspects of the disclosure, as well as specific examples thereof, are intended to encompass equivalents thereof.

Unless otherwise specified, use of the terms "connect," "engage," "couple," "attach," or any other like term describing an interaction between elements is not meant to limit the interaction to direct interaction between the elements and may also include indirect interaction between the elements described.

Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical or horizontal axis. Unless otherwise specified, use of the term "subterranean formation" shall be construed as encompassing both areas below exposed earth and areas below earth covered by water, such as seawater or fresh water.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

Each of the aspects disclosed in the SUMMARY can have one or more of the following additional elements in combination. Element 1: wherein the pumping system is an injection pumping system or a HF pumping system. Element 2: wherein the pump swap tool includes a pump connection apparatus capable to connect and disconnect a pump from the pump manifold and the one or more isolation devices. Element 3: wherein the pump swap tool includes one or more pump moving apparatuses capable to perform the removing and placing. Element 4: wherein one or more of the one or more pump moving apparatuses includes a protection barrier suitable to protect a worker of the one or more pump moving apparatuses from discharges from other pumps in the set of pumps. Element 5: wherein the one or more pump moving apparatuses are one or more of a forklift, a gantry crane, or a PIT. Element 6: wherein the one or more pump moving apparatuses are two pump moving apparatuses. Element 7: wherein the one or more pump moving apparatuses utilize one or more cameras. Element 8: wherein user observation windows of the one or more pump moving apparatuses are protected with a protection barrier. Element 9: wherein the set of pumps are located on one or more pump unit skids. Element 10: wherein each pump in the set of pumps is separable from the one or more pump unit skids. Element 11: wherein a first pump unit skid in the one or more pump unit skids supports more than one pump in the set of pumps. Element 12: wherein the central open area is covered with a matting. Element 13: wherein the pump manifold is located on an outside perimeter of the set of pumps. Element 14: further comprising aligning the second pump to the isolation device. Element 15: wherein the pumping system is one of an injection well pumping system or a HF pumping system. Element 16: wherein the swapping is performed using one or more pump moving apparatuses. Element 17: wherein one or more of the one or more pump moving apparatuses includes a protection barrier suitable to protect a user of the one or more pump moving apparatuses from discharges from other pumps in the set of pumps. Element 18: wherein the one or more pump moving apparatuses utilize one or more cameras and user observation windows of the one or more pump moving apparatuses are protected by the protection barrier. Element 19: wherein the one or more pump moving apparatuses are two or more pump moving apparatuses. Element 20: wherein the set of pumps are located on one or more pump unit skids. Element 21: wherein each pump in the set of pumps is separable from the pump unit skid. Element 22: wherein a first pump unit skid in the one or more pump unit skids supports more than one pump in the set of pumps. Element 23: wherein a pump manifold is located on an outside perimeter of the set of pumps.

What is claimed is:

1. A pumping system, comprising:

a pump manifold, capable of transporting low pressure fluids and high pressure fluids for well site operations, where the pump manifold is located at a well site;

a set of three or more pumps coupled to the pump manifold using one or more isolation devices for each pump in the set of pumps, wherein the one or more isolation devices are capable of isolating one or more pumps in the set of three or more pumps; and a pump swap tool including one or more pump moving apparatuses capable of lifting, carrying and removing a pump from the set of three or more pumps and placing a replacement pump into the set of three or more pumps while the pumping system continues pumping, the set of three or more pumps arranged on a perimeter of a central open area large enough for the one or more pump moving apparatuses to operate freely within and access each of the three or more pumps in the central open area without being impeded by piping or manifolds, the removing and placing configured to be performed proximate the perimeter of the central open area.

2. The pumping system as recited in claim 1, wherein the pumping system is an injection pumping system or a hydraulic fracturing (HF) pumping system.

3. The pumping system as recited in claim 1, wherein the pump swap tool includes a pump connection apparatus capable to connect and disconnect the pump from the pump manifold and the one or more isolation devices.

4. The pumping system as recited in claim 1, wherein one or more of the one or more pump moving apparatuses includes a protection barrier suitable to protect a worker of the one or more pump moving apparatuses from discharges from other pumps in the set of pumps.

5. The pumping system as recited in claim 1, wherein the one or more pump moving apparatuses are one or more of a forklift, a gantry crane, or a powered industrial truck (PIT).

6. The pumping system as recited in claim 1, wherein the one or more pump moving apparatuses are two pump moving apparatuses.

7. The pumping system as recited in claim 1, wherein the one or more pump moving apparatuses utilize one or more cameras, and user observation windows of the one or more pump moving apparatuses are protected with a protection barrier.

8. The pumping system as recited in claim 1, wherein the set of three or more pumps are located on one or more pump unit skids.

9. The pumping system as recited in claim 8, wherein each pump in the set of three or more pumps is separable from the one or more pump unit skids.

10. The pumping system as recited in claim 8, wherein a first pump unit skid in the one or more pump unit skids supports more than one pump in the set of three or more pumps.

11. The pumping system as recited in claim 1, wherein the central open area is covered with a matting.

12. The pumping system as recited in claim 1, wherein the pump manifold is located on an outside perimeter of the set of pumps.

13. A method to hot swap pumps in a pumping system, comprising:

isolating a pump in a set of three or more pumps using an isolation device, wherein the set of three or more pumps are utilized to pump fluid under a high pressure into a wellbore, and the set of three or more pumps are coupled to the pumping system;

bleeding the high pressure from the pump, and evacuating fluid from the pump;

disconnecting the pump;

swapping the pump with a replacement pump using a pump swap tool including one or more pump moving apparatuses capable of lifting and carrying the pump and replacement pump, wherein the replacement pump is added to the set of three or more pumps and the pump is removed from the set of three or more pumps;

connecting the replacement pump to the pumping system; and enabling the replacement pump for pumping operations, wherein the set of three or more pumps are arranged on a perimeter of a central open area large enough for the one or more pump moving apparatuses to operate freely within and access each of the three or more pumps in the central open area without being impeded by piping or manifolds, and further wherein the swapping is performed proximate the perimeter of the central open area.

14. The method as recited in claim 13, further comprising: aligning the replacement pump to the isolation device.

15. The method as recited in claim 13, wherein the pumping system is one of an injection well pumping system or a hydraulic fracturing (HF) pumping system.

16. The method as recited in claim 13, wherein one or more of the one or more pump moving apparatuses includes a protection barrier suitable to protect a user of the one or more pump moving apparatuses from discharges from other pumps in the set of pumps.

17. The method as recited in claim 16, wherein the one or more pump moving apparatuses utilize one or more cameras and user observation windows of the one or more pump moving apparatuses are protected by the protection barrier.

18. The method as recited in claim 13, wherein the one or more pump moving apparatuses are two or more pump moving apparatuses.

19. The method as recited in claim 13, wherein the set of three or more pumps are located on one or more pump unit skids.

20. The method as recited in claim 19, wherein each pump in the set of three or more pumps is separable from the pump unit skid.

21. The method as recited in claim 19, wherein a first pump unit skid in the one or more pump unit skids supports more than one pump in the set of three or more pumps.

22. The method as recited in claim 13, wherein a pump manifold is located on an outside perimeter of the set of three or more pumps.

* * * * *